Dec. 27, 1927.
R. B. FAGEOL
1,654,284
CONVERTIBLE WAGON AND SLED
Filed Aug. 9, 1926
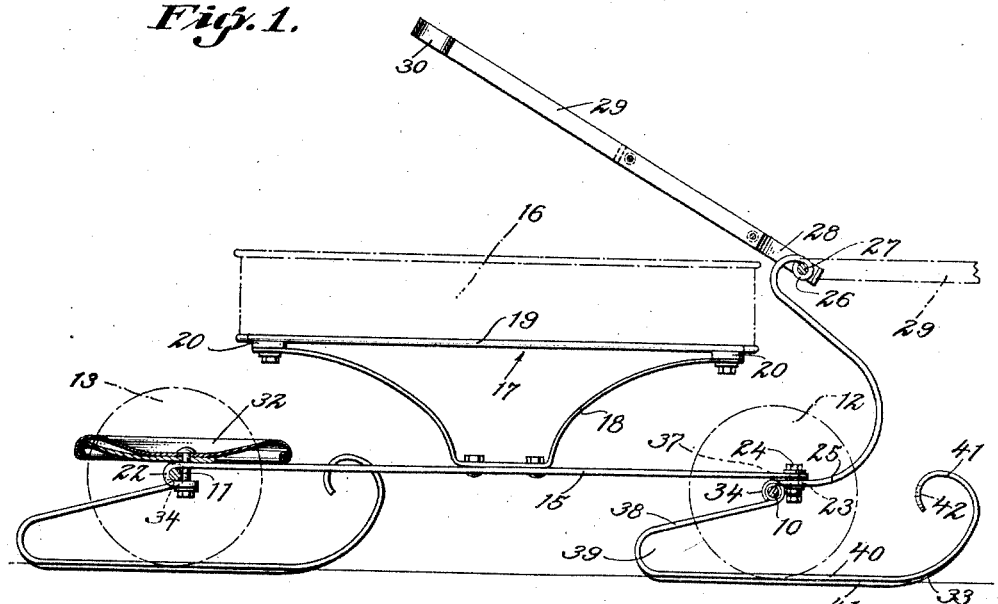
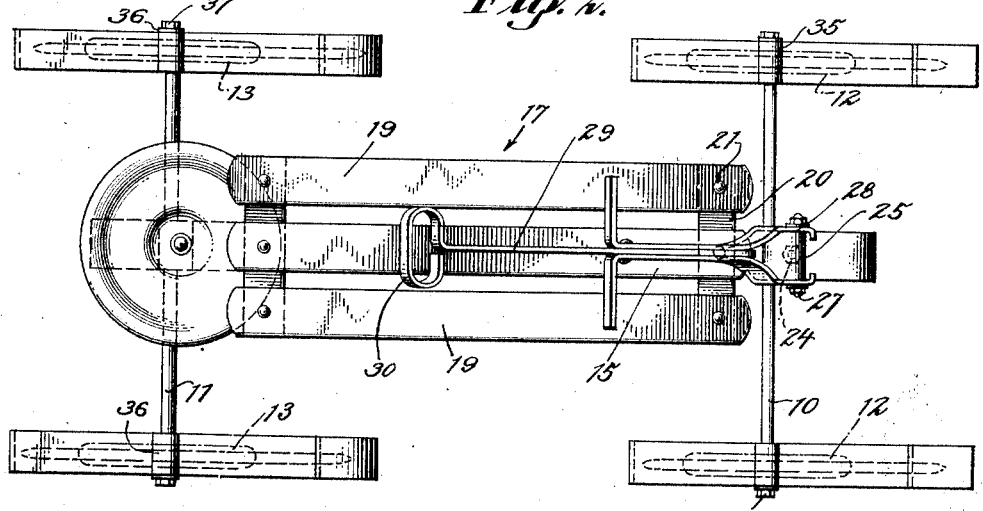
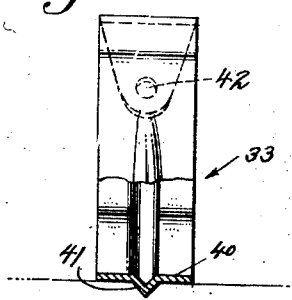
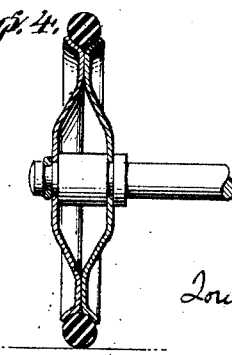
INVENTOR.
Rollie B. Fageol
BY
Townsend, Loftin & Abbott
ATTORNEYS.

Patented Dec. 27, 1927.

1,654,284

UNITED STATES PATENT OFFICE.

ROLLIE B. FAGEOL, OF LOS ANGELES, CALIFORNIA.

CONVERTIBLE WAGON AND SLED.

Application filed August 9, 1926. Serial No. 128,116.

This invention pertains to a spring vehicle and particularly pertains to a convertible wagon and sled. It is the principal object of the present invention to provide a spring vehicle particularly designed for the use of children and which vehicle may be used as a wagon or buckboard and may be easily converted for use on snow and ice by the substitution of sled runners for wheels of the running gear, said structure being of all spring construction whereby the running gear and the body of the vehicle, as well as the steering mechanism, will be of a resilient nature and will give a buckboard effect to the vehicle.

The present invention contemplates the use of a spring body supported at opposite ends upon wheels or resilient sled runners, said body being further fitted with steering means by which the course of the vehicle may be guided.

The invention is illustrated by way of example in the accompanying drawings in which—

Figure 1 is a view in side elevation showing the vehicle with which the present invention is concerned and disclosing it adapted for use as a sled, wheels being indicated in dotted lines.

Figure 2 is a view in plan showing the vehicle as disclosed in Figure 1.

Figure 3 is an enlarged fragmentary view in section and end elevation showing one of the sled runners.

Figure 4 is a view in section through one of the axles showing a wheel mounted thereon.

10 indicates a front axle and 11 indicates a rear axle. These front axles normally receive front wheels 12 and rear wheels 13, the wheels being of substantially the same diameter so that they will support a body bar 15 in a substantially horizontal position. The body bar 15 is preferably formed of spring steel and is free to flex vertically. If desired, a wagon bed 16 may be mounted upon the body bar as indicated by dotted lines in Figure 1, or a buckboard bed may be mounted thereon as indicated at 17 in Figures 1 and 2. In either event the bed or supporting platform is held in position upon the body bar 15 at a point midway the length of said bar by a supporting bracket 18. This bracket has a central portion extending longitudinally of the body bar and fastened thereto, and upwardly and outwardly flaring arms which terminate in end portions adapted to be fastened to the wagon bed 16 or the buckboard structure 17. The buckboard structure 17 comprises a plurality of parallel slats 19 extending in a horizontal plane and preferably spaced apart with relation to each other. These slats are fastened to cross members 20 by suitable bolts or rivets 21, the cross members in turn being secured to the upper ends of the bracket structure 18. It is to be understood that the bracket structure 18 is preferably formed of spring metal and that the cross members 20 and the longitudinally extending slats 19 are formed of the same material. This provides a resilient bed for the vehicle, which bed is mounted upon a resilient body bar, the entire structure being free to flex vertically and having considerable resiliency and rebound.

The body bar 15 terminates at its rear end in a scrolled eye 22 which receives the rear axle 11. Its further end is formed with a bolt hole 23 through which a king bolt 24 may pass. This bolt extends vertically through the body bar 15 and through an opening in a steering tongue 25. The tongue 25 is formed from a resilient metal bar of flat spring material, the same as the other bars and slats previously described. This tongue extends forwardly of the king bolt and is recurved to form an upwardly projecting portion which terminates in a scrolled end. The end of the scroll is formed with an eye 26 receiving a bolt 27. The bolt 27 passes through the yoke 28 of a rigid tongue section 29, which tongue section may swing in a vertical plane and may be swung rearwardly over the body of the vehicle. For convenience, the tongue terminates in a looped handle 30. The resilient tongue section 25 extends rearwardly from the king bolt 23 and assumes a position parallel to the body bar 15. This end of the resilient tongue terminates in an eye 31 which receives the axle 10 and by which the axle is caused to swing in a horizontal plane around the king bolt 23.

Fastened to the body bar 15 at a point over the rear axle 11 is a platform 32 upon which the rider of the vehicle may stand in the event that he wishes to use the vehicle as a "scooter".

In sections of the country where seasons of sledding may be had, it is desirable to interchange the wheels of the running gear for sled runners. This is accomplished in the present instance by merely removing the wheels 12 and 13 and substituting sled runners 33 therefor. These runners are all of resilient construction and are made from flat strips of steel, one end of which terminates in an eye 34. This eye properly fits upon the spindles 35 of the axles 10 and 11 where they are thus secured by lock washers 36 and nuts 37. The eyes 34 fit the spindles of the axles with a free running fit so that the runners may readily swing vertically while being held against lateral movement with relation to the axle.

The bar forming each runner extends rearwardly from the eye 34 to provide a downwardly and rearwardly inclined portion 38 which is bent upon itself to form a loop 39. The bar then continues forwardly and in a horizontal plane to form the flat runner section 40 which terminates at its forward end in an upturned scroll section 41. Suitable perforations 42 may be made in the forward runner to receive a rope by which the vehicle may be pulled in the event that the rider does not wish to use the tongue of the vehicle for starting.

In order to more satisfactorily adapt the sled runners for use on the ice and to assist the runners in maintaining their course under all conditions, a longitudinally extending V-shaped bead 41 is formed in the runner sections 40 as shown in Figures 1 and 3 of the drawing. When operating on ice the narrow edge of the bead will come in contact with the ice and serve as the runner and when operating in snow it will be seen that this bead will tend to prevent side slippage of the vehicle.

In using the present invention, it will be evident that the rider may stand on the platform 32 or may be seated upon the bed or body. When the vehicle is being used as a sled and is equipped with the buckboard bed 17, the rider may lie lengthwise of the bed and coast on the sled. In any event, it will be evident that with the use of the wheels or the spring runners, the bed will be resiliently hung and supported between the axles and when the device is used as a sled the runners will give added resiliency due to the spring construction of the runners and their peculiar looped design whereby the runners may individually flex and accommodate themselves to irregularities in the contour of the ground over which they are passing.

It will be seen that the device here disclosed, while simple in construction, provides a convertible vehicle of novel design, and which vehicle may serve as a desirable amusement device—particularly for children.

While I have shown the preferred form of my invention, it will be understood that various changes in the combination, construction and arrangement of parts may be made by those skilled in the art without departing from the spirit of the invention as claimed.

Having thus described my invention, what I claim and desire to secure by Letters Patent is—

1. A vehicle comprising a substantially horizontally extending body bar, a bed structure mounted thereon at a point intermediate the ends of said bar, a rear axle fastened to one end of said bar, a king bolt fastened to the opposite end of said bar, a tongue extending beneath said end of the body bar and through which tongue the king bolt passes, an axle secured to the said tongue at a point in the rear of said king bolt, and a vehicle running gear mounted upon said front and rear axles.

2. A vehicle comprising a substantially horizontally extending body bar, a bed structure mounted thereon at a point intermediate the ends of said bar, a rear axle fastened to one end of said bar, a king bolt fastened to the opposite end of said bar, a tongue extending beneath said end of the body bar and through which tongue the king bolt passes, an axle secured to the said tongue at a point in the rear of said king bolt, and spring sled runners mounted upon the ends of said axles to afford a running gear therefor.

3. A vehicle comprising a relatively narrow and thin body bar extending horizontally, a rear axle secured at one end of said body bar, a tongue structure extending forwardly from beneath the opposite end of said body bar, a king bolt passing downwardly through said opposite end of the body bar and the tongue whereby the tongue may swing in a horizontal plane therebeneath, a front axle secured to said tongue and adapted to be moved in a horizontal plane around the axis of the king bolt, a bed supporting bracket secured upon the body bar at a point intermediate its ends and bearing upon said body bar at a relatively short distance, whereby the body bar will be free to swing vertically, a bed structure mounted upon said supporting brackets and running gear carried by the axles for the support of the vehicle.

4. A vehicle comprising a relatively narrow and thin body bar extending horizontally, a rear axle secured at one end of said body bar, a tongue structure extending forwardly from beneath the opposite end of said body bar, a king bolt passing downwardly through said opposite end of the body bar and the tongue whereby the tongue may swing in a horizontal plane therebeneath, a front axle secured to said tongue and adapted to be moved in a horizontal plane around the axis of the king bolt, a bed structure mounted upon said supporting bracket, said structure comprising a plurality of vertical resilient slats.

5. A vehicle comprising a vertically resilient body bar extending horizontally, an axle under the rear end of said bar, a tongue formed of resilient material and extending forwardly forming a point beneath the forward end of said body bar and then extending upwardly, a rigid tongue member carried thereby and vertically pivoted thereto, a rear extension formed as a continuation of said tongue, a front axle carried with said extension, a king bolt passing downwardly through the forward end of the body bar and the tongue whereby the tongue may swing in a horizontal plane beneath the body bar, a rigid step structure secured to the body bar at a point substantially over the rear axle, and upon which a person might stand, and running gear carried by the axles.

6. A vehicle comprising a vertically resilient body bar terminating at its rear end in a down-turned eye, a rear axle passing therethrough and gripped thereby at a point intermediate its ends, a steering tongue formed of flat resilient material and having a portion extending parallel to and beneath the forward end of said body bar and terminating in an eye, a front axle embraced by said eye and gripping said axle at a point intermediate its ends, a king bolt passing downwardly through the front end of the body bar and through the parallel portion of the resilient tongue member, said tongue curving upwardly and rearwardly to terminate in a scrolled eye, a horizontally extending bolt passing through said eye, a rigid tongue vertically pivoted thereon, and running gear mounted upon the axles for the support of the vehicle.

7. A vehicle comprising a vertically resilient body bar terminating at its rear end in a down-turned eye, a rear axle passing therethrough and gripped thereby at a point intermediate its ends, a steering tongue formed of flat resilient material and having a portion extending parallel to and beneath the forward end of said body bar and terminating in an eye, a front axle embraced by said eye and gripping said axle at a point intermediate its ends, a king bolt passing downwardly through the front end of the body bar and through the parallel portion of the resilient tongue member, said tongue curving upwardly and rearwardly to terminate in a scrolled eye, a horizontally extending bolt passing through said eye, a rigid tongue vertically pivoted thereon, and running gear mounted upon the axles for the support of the vehicle, and a rigid step mounted upon the body bar at a point substantially over the rear axle.

8. A vehicle comprising a vertically resilient body bar terminating at its rear end in a down-turned eye, a rear axle passing therethrough and gripped thereby at a point intermediate its ends, a steering tongue formed of flat resilient material and having a portion extending parallel to and beneath the forward end of said body bar and terminating in an eye, a front axle embraced by said eye and gripping said axle at a point intermediate its ends, a king bolt passing downwardly through the front end of the body bar and through the parallel portion of the resilient tongue member, said tongue curving upwardly and rearwardly to terminate in a scrolled eye, a horizontally extending bolt passing through said eye, a rigid tongue vertically pivoted thereon, and running gear mounted upon the axles for the support of the vehicle, and a bed structure mounted at a point intermediate the ends of the body bar and resiliently supported thereby.

9. A vehicle comprising a vertically resilient body bar terminating at its rear end in a down-turned eye, a rear axle passing therethrough and gripped thereby at a point intermediate its ends, a steering tongue formed of flat resilient material and having a portion extending parallel to and beneath the forward end of said body bar and terminating in an eye, a front axle embraced by said eye and gripping said axle at a point intermediate its ends, a king bolt passing downwardly through the front end of the body bar and through the parallel portion of the resilient tongue member, said tongue curving upwardly and rearwardly to terminate in a scrolled eye, a horizontally extending bolt passing through said eye, a rigid tongue vertically pivoted thereon, and running gear mounted upon the axles for the support of the vehicle, and a bed structure mounted at a point intermediate the ends of the body bar and resiliently supported thereby, said structure comprising a plurality of vertically resilient slats.

10. A vehicle comprising a vertically resilient body bar terminating at its rear end in a down-turned eye, a rear axle passing therethrough and gripped thereby at a point intermediate its ends, a steering tongue formed of flat resilient material and having a portion extending parallel to and beneath the forward end of said body bar and terminating in an eye, a front axle embraced by said eye and gripping said axle at a point intermediate its ends, a king bolt passing downwardly through the front end of the body bar and through the parallel portion of the resilient tongue member, said tongue curving upwardly and rearwardly to terminate in a scrolled eye, a horizontally extending bolt passing through said eye, a rigid tongue vertically pivoted thereon, and running gear mounted upon the axles for the support of the vehicle, and a bed structure mounted at a point intermediate the ends of the body bar and resiliently supported thereby, said structure comprising a plurality of vertically resilient slats, and a step mounted upon the body bar at a point over the rear axle.

ROLLIE B. FAGEOL.